(12) United States Patent
Katou

(10) Patent No.: US 9,500,891 B2
(45) Date of Patent: Nov. 22, 2016

(54) LIQUID CRYSTAL DISPLAY DEVICE COMPRISING A LIGHT BLOCKING MEMBER HAVING AN INNER PERIPHERAL EDGE

(71) Applicant: Panasonic Liquid Crystal Display Co., Ltd., Himeji-shi, Hyogo (JP)

(72) Inventor: Takashi Katou, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 14/199,637

(22) Filed: Mar. 6, 2014

(65) Prior Publication Data
US 2015/0192822 A1 Jul. 9, 2015

(30) Foreign Application Priority Data

Jan. 6, 2014 (JP) ................................ 2014-000619

(51) Int. Cl.
*G02F 1/1333* (2006.01)

(52) U.S. Cl.
CPC ............ *G02F 1/133308* (2013.01); *G02F 2001/133317* (2013.01)

(58) Field of Classification Search
CPC .......... G02F 1/133512; G02F 1/1339; G02F 1/134363; G02F 2001/133317; G02F 2001/13332; G02B 6/0011; G02B 6/0013; G02B 6/0016; G02B 6/0015; G02B 6/0023; G02B 6/0025; G02B 6/0026
See application file for complete search history.

(56) References Cited

U.S. PATENT DOCUMENTS

| | | | | |
|---|---|---|---|---|
| 7,907,232 B2* | 3/2011 | Enomoto | ........... | G02F 1/133308 349/60 |
| 8,264,635 B2* | 9/2012 | Lee | ................... | G02F 1/133308 349/150 |
| 8,596,850 B2* | 12/2013 | Hirohata | .............. | G02B 6/0038 349/61 |
| 2009/0322989 A1* | 12/2009 | Kim | .................. | G02F 1/133308 349/65 |
| 2010/0060816 A1* | 3/2010 | Fukai | .................. | G02F 1/13452 349/58 |
| 2010/0110328 A1* | 5/2010 | Tatebayashi | ......... | G02B 6/0091 349/58 |
| 2011/0051046 A1* | 3/2011 | Kim | ........................ | G02B 5/02 349/65 |
| 2012/0013810 A1* | 1/2012 | Takata | ................. | G02B 5/0284 348/739 |
| 2013/0148381 A1* | 6/2013 | Hatta | ............................ | 362/624 |

FOREIGN PATENT DOCUMENTS

JP 2008-129240 6/2008

* cited by examiner

*Primary Examiner* — Paul Lee
(74) *Attorney, Agent, or Firm* — Hamre, Schumann, Mueller & Larson, P.C.

(57) ABSTRACT

Provided is a liquid crystal display device capable of improving display characteristics in an edge region of a display surface of a liquid crystal display panel. In a liquid crystal display device, a frame includes a protruding portion that protrudes from an inner peripheral surface thereof to an inner periphery side between a liquid crystal display panel and a backlight unit. The protruding portion includes a first surface located on the inner periphery side, on which an optical sheet is arranged; and a second surface located on an outer periphery side and closer to the liquid crystal display panel than the first surface, on which a light blocking member is arranged. The light blocking member protrudes to the inner periphery side with respect to the second surface, and overlaps with the first surface in a thickness direction of the liquid crystal display panel.

10 Claims, 3 Drawing Sheets

LIQUID CRYSTAL DISPLAY DEVICE COMPRISING A LIGHT BLOCKING MEMBER HAVING AN INNER PERIPHERAL EDGE

CROSS-REFERENCE TO RELATED APPLICATION

The present application claims priority from Japanese application JP2014-000619 filed on Jan. 6, 2014, the entire content of which is hereby incorporated by reference into this application.

TECHNICAL FIELD

The present invention relates to a liquid crystal display device.

BACKGROUND

Japanese Patent Application Laid-open No. 2008-129240 discloses a liquid crystal display device that includes a frame provided with a support frame protruding between a liquid crystal display panel and a backlight unit, in which an optical sheet is arranged in a space surrounded by the liquid crystal display panel, the backlight unit and the support frame.

In the above-mentioned technology, there is a fear in that when an edge region of a display surface of the liquid crystal display panel is observed in the direction toward the outer periphery side, light reflected on an inner edge surface of the support frame may be recognized.

The present invention has been made in view of the above-mentioned problem, and it is an object thereof to provide a liquid crystal display device capable of improving display characteristics in the edge region of the display surface of the liquid crystal display panel.

SUMMARY

In order to solve the above-mentioned problem, a liquid crystal display device according to one embodiment of the present application includes: a liquid crystal display panel; a backlight unit arranged to be opposed to the liquid crystal display panel; an optical sheet arranged between the liquid crystal display panel and the backlight unit; a frame arranged around a periphery of the liquid crystal display panel, the backlight unit, and the optical sheet, the frame including a protruding portion that protrudes from an inner peripheral surface of the frame to an inner periphery side between the liquid crystal display panel and the backlight unit; and a light blocking member arranged between the liquid crystal display panel and the protruding portion. The protruding portion includes two surfaces opposed to the liquid crystal display panel, the two surfaces including: a first surface located on the inner periphery side, on which the optical sheet is arranged; and a second surface located on an outer periphery side and closer to the liquid crystal display panel than the first surface, on which the light blocking member is arranged. The light blocking member protrudes to the inner periphery side with respect to the second surface, and overlaps with the first surface in a thickness direction of the liquid crystal display panel.

Further, according to one embodiment of the present application, the light blocking member may be arranged on the second surface through intermediation of a cushion member.

Further, according to one embodiment of the present application, the light blocking member may be a light blocking tape.

Further, according to one embodiment of the present application, the light blocking member may overlap with the optical sheet in the thickness direction of the liquid crystal display panel.

Further, according to one embodiment of the present application, the light blocking member may overlap with a black matrix included in a color filter substrate of the liquid crystal display panel in the thickness direction of the liquid crystal display panel.

Further, according to one embodiment of the present application, one surface of the light blocking member that is opposed to the liquid crystal display panel may be black, and the other surface of the light blocking member that is opposed to the protruding portion may be white.

Further, according to one embodiment of the present application, one space may be formed between the liquid crystal display panel and the optical sheet, and another space may be formed between the backlight unit and the optical sheet.

Further, according to one embodiment of the present application, the frame may include a bezel portion that is opposed to an edge region of a display surface of the liquid crystal display panel, and a space may be formed between the edge region of the display surface of the liquid crystal display panel and the bezel portion.

According to one embodiment of the present application, the optical sheet is arranged on the first surface of the protruding portion of the frame, which is opposed to the liquid crystal display panel, and hence light reflected on an inner edge surface of the protruding portion is prevented from being easily recognized owing to the presence of the optical sheet. Consequently, the display characteristics in the edge region of the display surface of the liquid crystal display panel may be improved.

Further, the amount of light in a space formed between the liquid crystal display panel and the protruding portion is increased because the optical sheet is arranged on the first surface of the protruding portion, but the light blocking member is arranged on the second surface of the protruding portion, thereby suppressing light sneaking into the display surface side from an edge of the liquid crystal display panel. Also with this, the display characteristics in the edge region of the display surface of the liquid crystal display panel may be improved.

DETAILED DESCRIPTION

Figure 1:
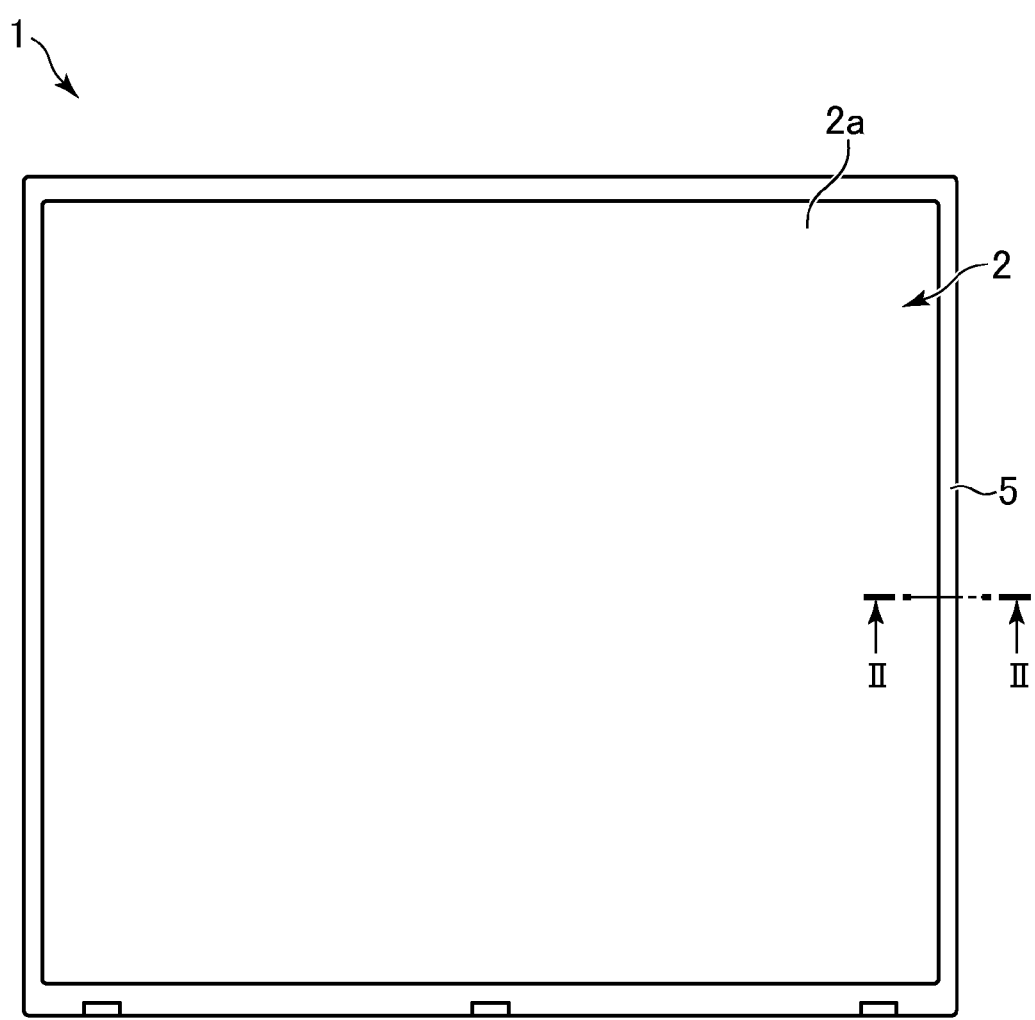
FIG. 1 is a front view of a liquid crystal display device according to one embodiment of the present application.
Figure 2:
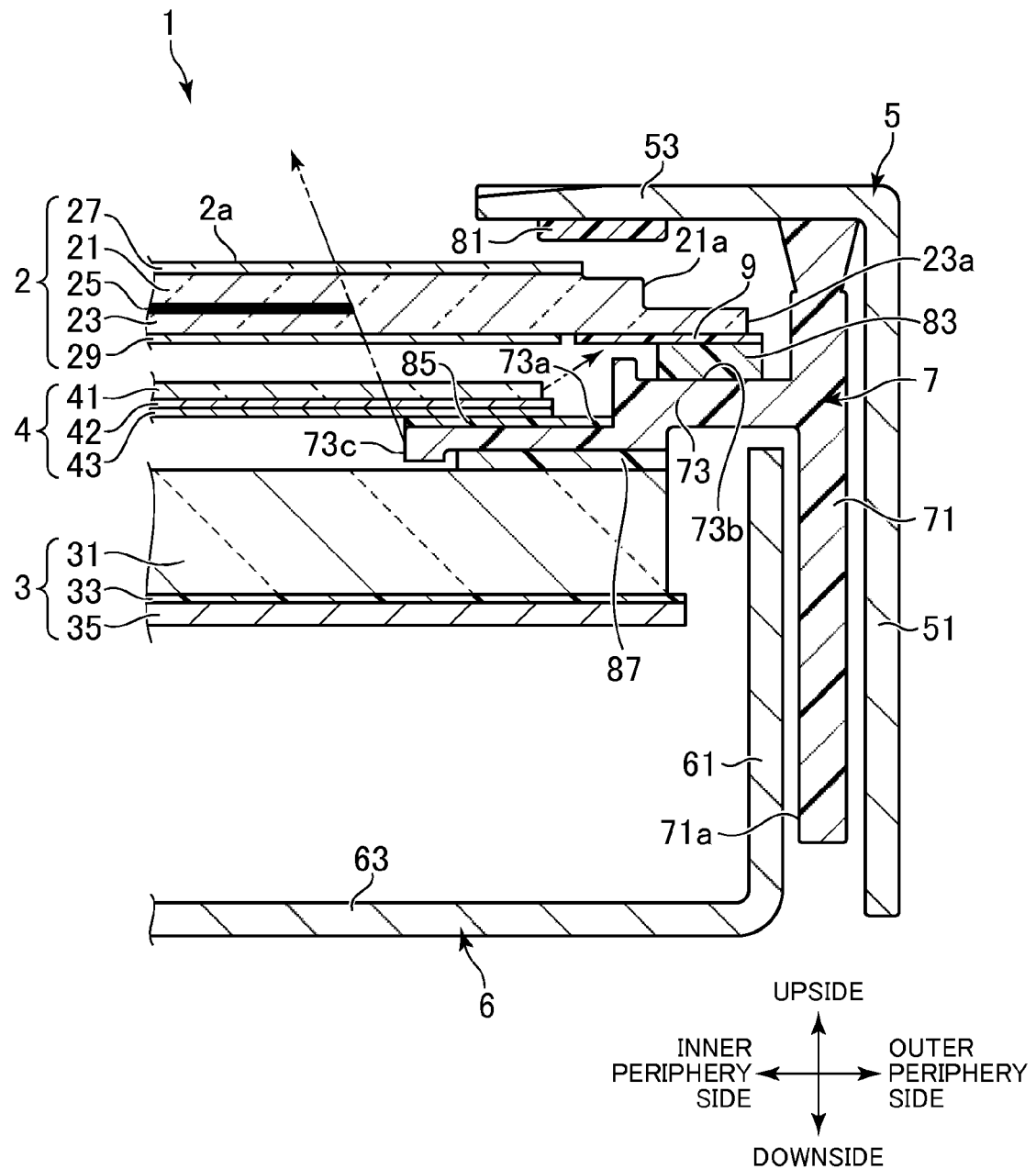
FIG. 2 is a cross-sectional view taken along the line II-II of FIG. 1.
Figure 3:
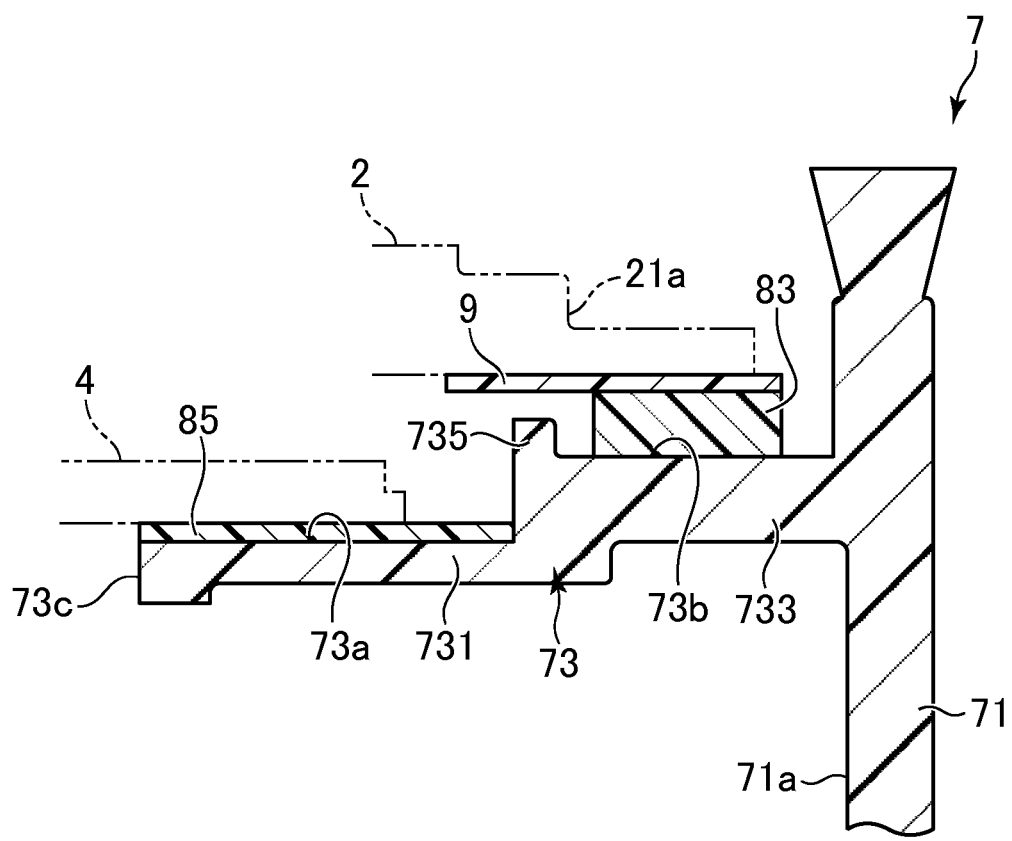
FIG. 3 is an enlarged view focusing on a main portion of FIG. 2.

One embodiment of the present application is now described below with reference to the accompanying drawings. FIG. 1 is a front view of a liquid crystal display device 1 according to one embodiment of the present application. FIG. 2 is a cross-sectional view taken along the line II-II of FIG. 1. FIG. 3 is an enlarged view focusing on a main portion of FIG. 2.

The liquid crystal display device 1 includes a liquid crystal display panel 2, a backlight unit 3 arranged to be opposed to the liquid crystal display panel 2, an optical sheet 4 arranged between the liquid crystal display panel 2 and the backlight unit 3, and a frame including an upside frame 5, a downside frame 6 and an intermediate frame 7 arranged around the periphery of those members.

In the following description, the side where the liquid crystal display panel 2 is located with respect to the backlight unit 3 in a thickness direction of the liquid crystal display panel 2 is referred to as "upside" and the opposite side is referred to as "downside". Further, the side where the liquid crystal display panel 2 is located with respect to the intermediate frame 7 in an in-plane direction of the liquid crystal display panel 2 is referred to as "inner periphery side" and the opposite side is referred to as "outer periphery side".

The liquid crystal display panel 2 includes a color filter (CF) substrate 21, a thin film transistor (TFT) substrate 23 arranged on the downside of the CF substrate 21, a liquid crystal layer 25 held between the CF substrate 21 and the TFT substrate 23, a polarizing plate 27 arranged on the upside of the CF substrate 21, and a polarizing plate 29 arranged on the downside of the TFT substrate 23.

The CF substrate 21 includes a black matrix (not shown). The black matrix is arranged on an entire non-display region defined between the liquid crystal layer 25 and a substrate end 21a.

A substrate end 23a of the TFT substrate 23 is located on the outer periphery side with respect to the substrate end 21a of the CF substrate 21, thereby exposing a part of an upside surface of the TFT substrate 23. On this exposed part, a driver IC is mounted, and a terminal to be connected to a FPC or the like is provided.

The backlight unit 3 includes a light guide plate 31, a reflective sheet 33 arranged on the downside of the light guide plate 31, and a rear plate 35 arranged on the downside of the reflective sheet 33.

The light guide plate 31 allows light entering from one side surface (in this embodiment, aside surface located on the downside in FIG. 1) to be uniformly emitted from an upside surface thereof, thereby causing the backlight unit 3 to function as a planar light source.

The optical sheet 4 includes a plurality of sheets 41 to 43. At least one of the sheets 41 to 43 has a function of diffusing the light from the backlight unit 3.

The upside frame 5 is a rectangular-shaped frame having an L-shaped cross section. Examples of suitable material for the upside frame 5 include a lightweight material with high rigidity, such as a steel plate. The upside frame 5 includes a side wall portion 51 and a bezel portion 53 that are formed into an L-shape.

The side wall portion 51 is located on the outer periphery side with respect to the downside frame 6 and the intermediate frame 7. The bezel portion 53 extends to the inner periphery side from an upside end of the side wall portion 51, and is opposed to an edge region of a display surface 2a of the liquid crystal display panel 2.

A cushion member 81 for lessening impact when the liquid crystal display panel 2 collides with the bezel portion 53 is adhered onto a downside surface of the bezel portion 53. Examples of suitable material for the cushion member 81 include a foamed resin and a synthetic rubber.

The bezel portion 53 is not adhered onto the edge region of the display surface 2a of the liquid crystal display panel 2. Thus, when the liquid crystal display panel 2 is located on the downside in a vertical movable range, a space is formed between the edge region of the display surface 2a of the liquid crystal display panel 2 and the bezel portion 53.

The downside frame 6 covers the downside of the backlight unit 3. Examples of suitable material for the downside frame 6 include a lightweight material with high rigidity, such as a steel plate. The downside frame 6 includes a side wall portion 61 and a rear portion 63.

The intermediate frame 7 is a rectangular-shaped frame having a substantially T-shaped or substantially L-shaped cross section. Examples of suitable material for the intermediate frame 7 include a synthetic resin. It is preferred that the intermediate frame 7 is black color or dark color and have light blocking properties. The intermediate frame 7 includes a side wall portion 71 and a protruding portion 73.

The side wall portion 71 is arranged between the side wall portion 51 of the upside frame 5 and the side wall portion 61 of the downside frame 6. An upside end of the side wall portion 71 abuts against the downside surface of the bezel portion 53 of the upside frame 5.

The protruding portion 73 protrudes from an inner peripheral surface 71a of the side wall portion 71 to the inner periphery side between the liquid crystal display panel 2 and the backlight unit 3. The protruding portion 73 includes an inner peripheral portion 731 and an outer peripheral portion 733 formed into a step-like shape, and has two surfaces 73a and 73b opposed to the liquid crystal display panel 2 (see FIG. 3).

The inner peripheral portion 731 is located on the inner periphery side and downside with respect to the outer peripheral portion 733, and has the first surface 73a. The outer peripheral portion 733 is located on the outer periphery side and upside with respect to the inner peripheral portion 731, and has the second surface 73b. In other words, the second surface 73b is closer to the liquid crystal display panel 2 than the first surface 73a.

A projecting portion 735 that protrudes to the upside with respect to the second surface 73b is provided between the first surface 73a and the second surface 73b. This suppresses misalignment of a cushion member 83 to be described later.

The backlight unit 3 is arranged on a downside surface of the inner peripheral portion 731. Specifically, the upside surface of the backlight unit 3 is adhered onto the downside surface of the inner peripheral portion 731 through intermediation of a double-sided tape 87.

The optical sheet 4 is arranged on the first surface 73a of the inner peripheral portion 731. Specifically, an edge portion of the optical sheet 4 is housed in a space formed between the liquid crystal display panel 2 and the first surface 73a.

In this manner, by arranging the optical sheet 4 on the first surface 73a of the inner peripheral portion 731, light reflected on an inner edge surface 73c of the protruding portion 73 is diffused by the optical sheet 4 to be hardly recognized.

The inner peripheral portion 731 is interposed between an edge portion of the backlight unit 3 and the edge portion of the optical sheet 4, and hence a space (clearance) is formed between the backlight unit 3 and the optical sheet 4. This clearance facilitates the mounting of the optical sheet 4.

Further, a reflective tape 85 having a white color or bright color upside surface is adhered onto the first surface 73a of the inner peripheral portion 731, thereby reflecting the light diffused by the optical sheet 4 to the upside. Note that, the optical sheet 4 is not adhered onto the first surface 73a or the reflective tape 85.

The cushion member 83 and a light blocking tape 9 are arranged on the second surface 73b of the outer peripheral portion 733. Specifically, the cushion member 83 is adhered onto the second surface 73b of the outer peripheral portion 733, and the light blocking tape 9 is adhered onto an upside surface of the cushion member 83.

The cushion member 83 lessens impact when the liquid crystal display panel 2 collides with the protruding portion 73. Examples of suitable material for the cushion member 83 include a synthetic rubber and a foamed resin.

The light blocking tape 9 is an example of a light blocking member, and is arranged between the edge portion of the liquid crystal display panel 2 and the protruding portion 73. Examples of suitable material for the light blocking tape 9 include a material having higher rigidity than the cushion member 83 even when thinned into a tape shape, such as a PET film. As the light blocking member, a member having higher rigidity than the light blocking tape 9, such as plastics, can be used, but it is easier for the light blocking tape 9 to be mounted on the cushion member 83.

The light blocking tape 9 is arranged on the protruding portion 73 of the intermediate frame 7, and is not adhered onto the edge region of the display surface 2a of the liquid crystal display panel 2. With this, even when the liquid crystal display panel 2 is located on the upside in the vertical movable range and when a space is formed between the edge region of the display surface 2a of the liquid crystal display panel 2 and the light blocking tape 9, the light blocking tape 9 serves as an eave, thereby being capable of preventing the light diffused from the optical sheet 4 from sneaking around an end portion of the liquid crystal display panel 2 into the display surface 2a side.

The light blocking tape 9 protrudes to the inner periphery side with respect to the second surface 73b, and overlaps with the first surface 73a in the thickness direction of the liquid crystal display panel 2. The light blocking tape 9 may further protrude to overlap with the optical sheet 4 in the thickness direction of the liquid crystal display panel 2. Note that, in order to secure the amount of light necessary at the edge portion of the display region, it is preferred to prevent the light blocking tape 9 from protruding to the inner periphery side with respect to the first surface 73a.

Further, the light blocking tape 9 overlaps with the black matrix included in the CF substrate 21 in the thickness direction of the liquid crystal display panel 2. As described above, the black matrix extends to the substrate end 21a of the CF substrate 21.

In this manner, by arranging the light blocking tape 9 on the second surface 73b of the outer peripheral portion 733, light sneaking into the display surface 2a side from the substrate ends 21a and 23a of the liquid crystal display panel 2 is suppressed.

The second surface 73b on which the cushion member 83 and the light blocking tape 9 are arranged is closer to the liquid crystal display panel 2 than the first surface 73a on which the optical sheet 4 is arranged. Thus, a space (clearance) is formed between the liquid crystal display panel 2 and the optical sheet 4. Consequently, the mounting of the liquid crystal display panel 2 is facilitated.

Further, the upside surface of the light blocking tape 9 is black color and the downside surface thereof is white color. Consequently, the amount of light in the space formed between the edge portion of the liquid crystal display panel 2 and the bezel portion 53 is reduced, and the amount of light in the space formed between the edge portion of the liquid crystal display panel 2 and the protruding portion 73 is improved.

Note that, the driver IC or the like is to be arranged on the exposed part of the upside surface of the TFT substrate 23, and hence it is not preferred from the viewpoint of yield that the light blocking member be mounted on the liquid crystal display panel 2 side. It is preferred to arrange the light blocking tape 9 on the protruding portion 73 as exemplified in this embodiment.

While what has been described above is one embodiment of the present application, it should be understood that the present invention is not limited to the above-mentioned embodiment and various modifications may be made by a person skilled in the art.

While the foregoing has described what are considered to be the best mode and/or other examples, it is understood that various modifications may be made therein and that the subject matter disclosed herein maybe implemented in various forms and examples, and that they may be applied in numerous applications, only some of which have been described herein. It is intended by the following claims to claim any and all modifications and variations that fall within the true scope of the present teachings.

What is claimed is:

1. A liquid crystal display device, comprising:
   a liquid crystal display panel;
   a backlight unit arranged to be opposed to the liquid crystal display panel;
   an optical sheet arranged between the liquid crystal display panel and the backlight unit;
   a frame arranged around a periphery of the liquid crystal display panel, the backlight unit, and the optical sheet,
   the frame includes an upside frame and an intermediate frame,
   the upside frame covering the periphery of the liquid crystal display panel,
   the intermediate frame comprising a protruding portion that protrudes from an inner peripheral surface of the intermediate frame to an inner periphery side between the liquid crystal display panel and the backlight unit; and
   a light blocking member arranged between the liquid crystal display panel and the protruding portion,
   wherein the protruding portion includes two surfaces opposed to the liquid crystal display panel,
   the two surfaces comprising:
      a first surface located on the inner periphery side, on which the optical sheet is arranged; and
      a second surface located on an outer periphery side and closer to the liquid crystal display panel than the first surface, on which the light blocking member is arranged, and
   wherein the light blocking member protrudes to the inner periphery side with respect to the second surface, and overlaps with the first surface in a thickness direction of the liquid crystal display panel,
   an inner peripheral edge of the light blocking member is located between an inner peripheral edge of the second surface and an inner peripheral edge of the first surface in a plan view.

2. The liquid crystal display device according to claim 1, wherein the light blocking member is arranged on the second surface through intermediation of a cushion member.

3. The liquid crystal display device according to claim 1, wherein the light blocking member is a light blocking tape.

4. The liquid crystal display device according to claim 1, wherein the light blocking member overlaps with the optical sheet in the thickness direction of the liquid crystal display panel.

5. The liquid crystal display device according to claim 1, wherein the light blocking member overlaps with a black matrix included in a color filter substrate of the liquid crystal display panel in the thickness direction of the liquid crystal display panel.

6. The liquid crystal display device according to claim 1, wherein one surface of the light blocking member that is opposed to the liquid crystal display panel is black, and the other surface of the light blocking member that is opposed to the protruding portion is white.

7. The liquid crystal display device according to claim 1, wherein one space is formed between the liquid crystal display panel and the optical sheet, and another space is formed between the backlight unit and the optical sheet.

8. The liquid crystal display device according to claim 1, wherein the light blocking member overlaps with an edge line between the first surface and the second surface, and a projecting portion protruding to an upside with respect to the second surface is provided along the edge line.

9. The liquid crystal display device according to claim 1, wherein a reflective tape is adhered onto the first surface located on the inner periphery side and is located between the first surface and the optical sheet.

10. The liquid crystal display device according to claim 1 further comprising a first cushion member attached to an interior surface of the upside frame and facing an end portion of the liquid crystal display panel, wherein
the end portion of the liquid crystal display panel is interposed between the first cushion member and the light blocking member.

* * * * *